US011409861B2

(12) United States Patent
Bolimovsky

(10) Patent No.: US 11,409,861 B2
(45) Date of Patent: Aug. 9, 2022

(54) PASSWORDLESS AUTHENTICATION

(71) Applicant: Herbert Bolimovsky, Pacifica, CA (US)

(72) Inventor: Herbert Bolimovsky, Pacifica, CA (US)

( * ) Notice: Subject to any disclaimer, the term of this patent is extended or adjusted under 35 U.S.C. 154(b) by 205 days.

(21) Appl. No.: 16/833,832

(22) Filed: Mar. 30, 2020

(65) Prior Publication Data

US 2020/0327219 A1 Oct. 15, 2020

Related U.S. Application Data

(60) Provisional application No. 62/832,431, filed on Apr. 11, 2019.

(51) Int. Cl.
*G06F 21/45* (2013.01)
*H04L 9/40* (2022.01)

(52) U.S. Cl.
CPC .......... *G06F 21/45* (2013.01); *H04L 63/0861* (2013.01); *G06F 2221/2117* (2013.01)

(58) Field of Classification Search
CPC ........................................................ G06F 21/45
See application file for complete search history.

(56) References Cited

U.S. PATENT DOCUMENTS

| | | | | |
|---|---|---|---|---|
| 10,686,781 | B1 * | 6/2020 | Kaditz | H04W 12/06 |
| 2014/0282961 | A1 * | 9/2014 | Dorfman | H04L 63/0861 726/7 |
| 2015/0249540 | A1 * | 9/2015 | Khalil | H04L 9/3268 713/158 |
| 2017/0118025 | A1 * | 4/2017 | Shastri | H04L 9/3234 |
| 2020/0034160 | A1 * | 1/2020 | Koren | H04L 41/0253 |

* cited by examiner

*Primary Examiner* — Simon P Kanaan
(74) *Attorney, Agent, or Firm* — Buckley, Maschoff & Talwalkar LLC

(57) ABSTRACT

Provided is passwordless user registration process in which a user initially registers a device or a network of trusted devices rather than submitting a password. Thus, example embodiments are directed to a truly passwordless user account across all devices. In one example, a method may include receiving a registration request of an unregistered user from an authentication device, the registration request comprising a user identifier and a device credential obtained by the authentication device, performing a passwordless registration of the unregistered user with an application, wherein the performing comprises registering the unregistered user as a passwordless user with passwordless access to the application and registering the authentication device as a first trusted device of the passwordless user, and transmitting a notification to the authentication device indicating successful passwordless registration.

19 Claims, 9 Drawing Sheets

100C

100A

200A

200B

300A

300B

PASSWORDLESS AUTHENTICATION

CROSS-REFERENCE TO RELATED APPLICATION(S)

This application claims the benefit of U.S. Provisional Application No. 62/832,431, filed on Apr. 11, 2019, in the United States Patent and Trademark Office, and which is incorporated herein by reference for all purposes.

BACKGROUND

Computer passwords are used to help identify and distinguish users and their access capabilities on a computer, a network, an application, and the like. Passwords can help restrict and prevent users from accessing programs that they are not authorized to view and/or use. However, passwords are one of the most vulnerable forms of authentication. There is almost no way for an authentication system to verify that a password is from a legitimate user or a malicious user without some additional form of authentication. Furthermore, some people use the same password across multiple accounts. Therefore, if one password gets compromised, it easily leads to other accounts being compromised.

Recently, organizations have begun turning to passwordless authentications. For example, a registered user of a software application may add an option to authenticate themselves using a biometric input such as a fingerprint, retinal scan, facial scan, or the like. However, before the user can elect to use a biometric instead of a password, the user must inevitable establish/register their account using a password. Thus, these recent attempts at passwordless authentication are not truly passwordless because while passwordless is enabled on the device, it is not enabled on the entire account.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
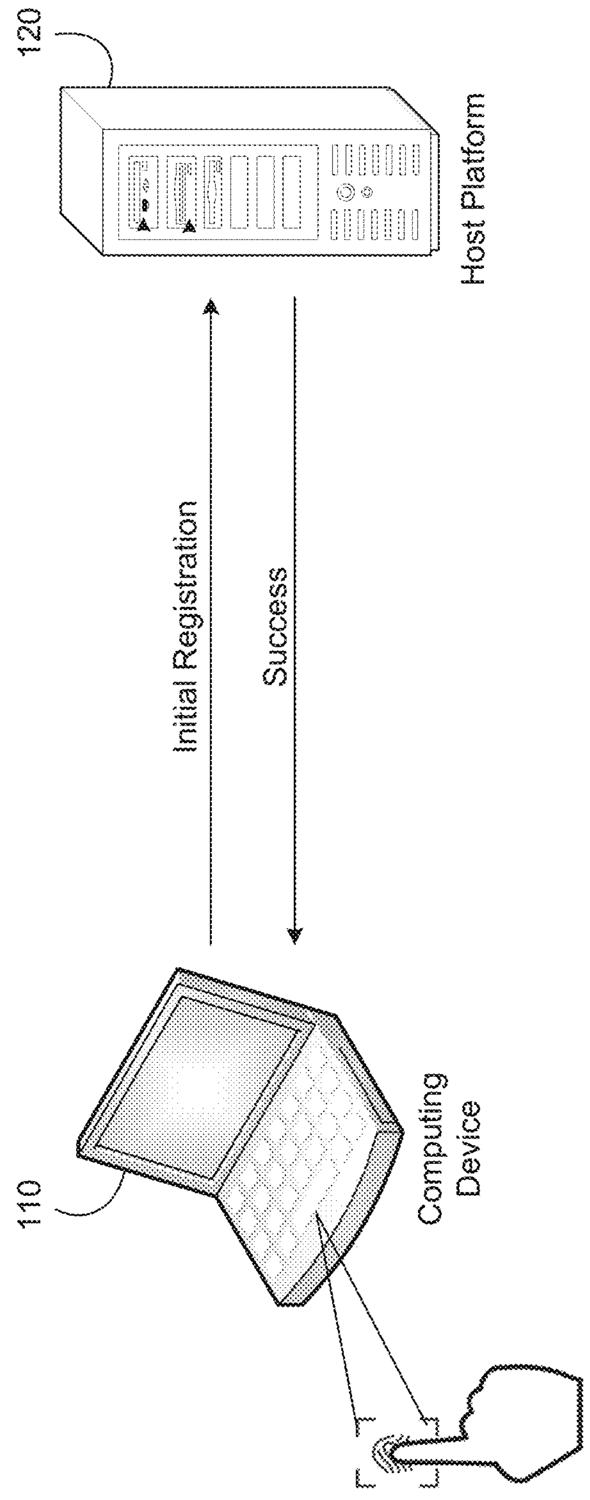
FIGS. 1A-1C are diagrams illustrating a process of initially registering a passwordless user in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Passwords are one of the least secure forms of computer authentication. For example, many users have weak or easily guessable passwords. Therefore, passwords can be hacked with brute force attack. As another example, users may rely on the same password across multiple different accounts. In this case, if a malicious actor is able to break into one account they may also be able to break into other accounts without much effort.

Another problem with password security is phishing attacks. A phishing attack occurs when a bad actor pretends to be a trusted entity to trick a user and steal information from the user. For example, a hacker may get a customer within an account on a banking website to enter their username and password into a false website which is controlled by the hacker, thereby stealing the customer's username and password.

When using a password, there is no connection between the device logging the user into the account (user device), and the device doing the authentication (host server). As a result, an unauthorized user with access to a password can break into the user's account from anywhere, and on any device.

Another form of 2FA is a hardware security key such as a YubiKey, etc. In this form of 2FA, a user has a separate, dedicated hardware device that they must carry around with them. The user must connect their hardware security key to the device they are using to login. After entering their username and password into a user interface on the device, the user is required to press a button, etc., on the connected hardware security key to confirm it is the password protected user who is logging in.

Meanwhile, the current state of the art for passwordless authentication is a set of standards known as Fast IDentity Online (FIDO). FIDO is a specification including WebAuth and CTAP which enables online passwordless logins through tools like biometrics, trusted hardware, and public key cryptography. For example, if a user has a banking application installed on a mobile device, FIDO standards enable the user to login using biometrics. However, the drawback of the current state of the art for passwordless authentication is that the account must first be registered using a password while the biometric authentications, 2FA, MFA, etc., can only be added afterwards. Thus, the current state of the art is not truly passwordless because a user must always start with a username and password. Furthermore, even if the user turns on passwordless for all of their devices, the account is still backed by the username and password of the user. Therefore, an attacker can still utilize password related attacks. Furthermore, once the attacker compromises the users account they can perform actions like resetting the user password and disabling trust in the registered passwordless devices, essentially locking the user out of their account and rendering the passwordless capabilities of their devices useless.

The example embodiments overcome the drawbacks of the current state of the art and provide a truly passwordless user account from the point of initially registering the account with an application. The example embodiments do not use passwords for authentication. Instead, the example embodiments enable a user to build a network of trusted devices which the user can then use to identify themselves and logon to their account without ever registering a password.

In this system, a user may use a physical gesture to prove that they are physically present at the trusted device. The trusted device may authenticate the user (e.g., via a biometric, retinal scan, etc.) without the need for a password. The authentication device may also generate a device credential (unique credential) which may be generated for a client running on the authentication device. For example, each client may have its own device credential generated by the authentication device (e.g., a web application in a web browser versus a native mobile application, two different web browsers, etc.) The authentication device may provide the device credential along with a verification of the physical gesture of the user at the authentication device. Thus, the relying party (e.g., application host server, etc.) receives both a verification from the authentication device that the user is physically present and the device credential providing the authentication device is sending the request. Accordingly, the relying party can allow access to the application based on the physical gesture and the device credential.

In the examples herein, the device credential refers to a credential that is obtained by the device. However, it should be appreciated, that the device may generate multiple different credentials and is not strictly limited to one device credential. For example, the device may create a different device credentials for different client applications on the device, etc. As another example, the device may create a different device credentials for different websites, different mobile applications, etc. Furthermore, the device may refer to any device (e.g., laptop, smart phone, desktop, tablet, server, smart wearable, etc.) capable of managing the device credential (via software/hardware) and then communicate to services over a communication medium. Furthermore, in the examples herein, a centralized environment is described with a relying party registering a passwordless user. It should also be appreciated that the example embodiments may be implemented within a decentralized environment such a blockchain, etc., where there is no central authority.

The system eliminates the security issues with passwords since even the initial registration of a new unregistered user does not need a password but instead registers a trusted device (and a device credential of the trusted device). The passwordless user can also setup a network of trusted devices via various protocols that enable the user to log into their passwordless account from both trusted systems and untrusted systems without the need for a password.

A user may initially start off with an authentication device (e.g., a smart phone, a tablet, a laptop, a hardware security key, etc.). The user may pre-register biometrics with the authentication device, for example, a biometric scan, a retinal scan, etc. However, this pre-registration is not required. When the user initially accesses an application for the first time in order to register for the application, the host platform of the application, also referred to as a relying party, may trust the authentication device on its first use. Here, the authentication device may create a device credential. The device credential may be sent from the authentication device to the host platform during an initial registration process. The request may also include a user ID such as a username, an email address, etc. The host platform may create a passwordless account for the user. In this case, rather than require a password, the host platform may register the authentication device/device credential as a login credential for the passwordless user.

Once the trusted device has been registered to the passwordless user's account, the passwordless user can access the account through the authentication device by proving that they are present at the authentication. Here, the proof may be any form of physical gesture such as a button push, a slide of a switch/slider, a retinal scan, a biometric scan, a facial scan, etc. In these examples, the system forces the user to provide proof that they are physically present at the authentication device where they are logging into their passwordless account. By requiring a physical gesture at the authentication device, the system ensures that a remote hacker has not taken over the authentication device because the remote hacker is not within physical proximity to the device. However, the physical gesture is not being used to authenticate the user with the relying party. Instead, the physical gesture is being used to verify that the user is actually present at the authentication device. Meanwhile, the relying party registers the authentication device (e.g., the device credential of the authentication device) with the user's passwordless account.

Some of the benefits of the example embodiments include requiring the user to prove intent to access their account through a physical gesture on the authentication device where the user is logging in. Here, the authentication device is also the device doing the authentication of the user. This can seriously deter attackers from remotely taking over the authentication device and hacking into the account, because the attacker must be physically present at the authentication device.

Another benefit of the example embodiments is that the system is more secure than traditional two-factor authentication. In many two-factor authentication systems/schemes, a user tries to access their account from an untrusted device, and the relying party sends a request to a different, previously registered user device to verify they are trying to access their account through the untrusted device. However, the traditional 2FA does not require a user to be physically present at the untrusted device. In other words, there is no physical tie to the new untrusted device where the user is trying to login. As a result, the 2FA prompt initiated by an attacker might be legitimately confirmed by the user on the user's trusted device.

Another benefit of the example embodiments is that the combination of authentication device handles the credential lifecycle. In other words, the authentication device may create the credential, rotate the credential, destroy the credential, etc., without ever exposing any of this information to the passwordless user. This prevents the passwordless user from accidentally divulging or being tricked into giving secure information to untrusting parties because the passwordless user is unaware of the credential or its value.

Another benefit of the example embodiments is that each client/RP pair may have its own credential which provides additional security. For example, a user may have accounts at two different banks (Bank A and Bank B). Here, each bank may have its own banking application. Furthermore, each banking application may have its own device credential that is created by the authentication device. Thus, if the device credential assigned to Bank A's application were to be compromised it would not affect Bank B's application.

In the examples described herein, a new user is initially registered with a passwordless user account, without relying on any passwords even during the initial registration. As another example, a password-based account may be converted into a truly passwordless account. For example, an application may currently rely on password based logins. With multiple security incidents and usability complaints from employees, the application host may decide to move over all of their users to a passwordless login system. To do this, an individual user logs into their existing account using the legacy methods (passwords, 2FA, etc.). The user may then opt into the new passwordless system, and registers their first, initial device. From here, the user follows the standard passwordless registration procedures to register additional devices. The specific implementation is wholly up to the application host.

Figure 1B:
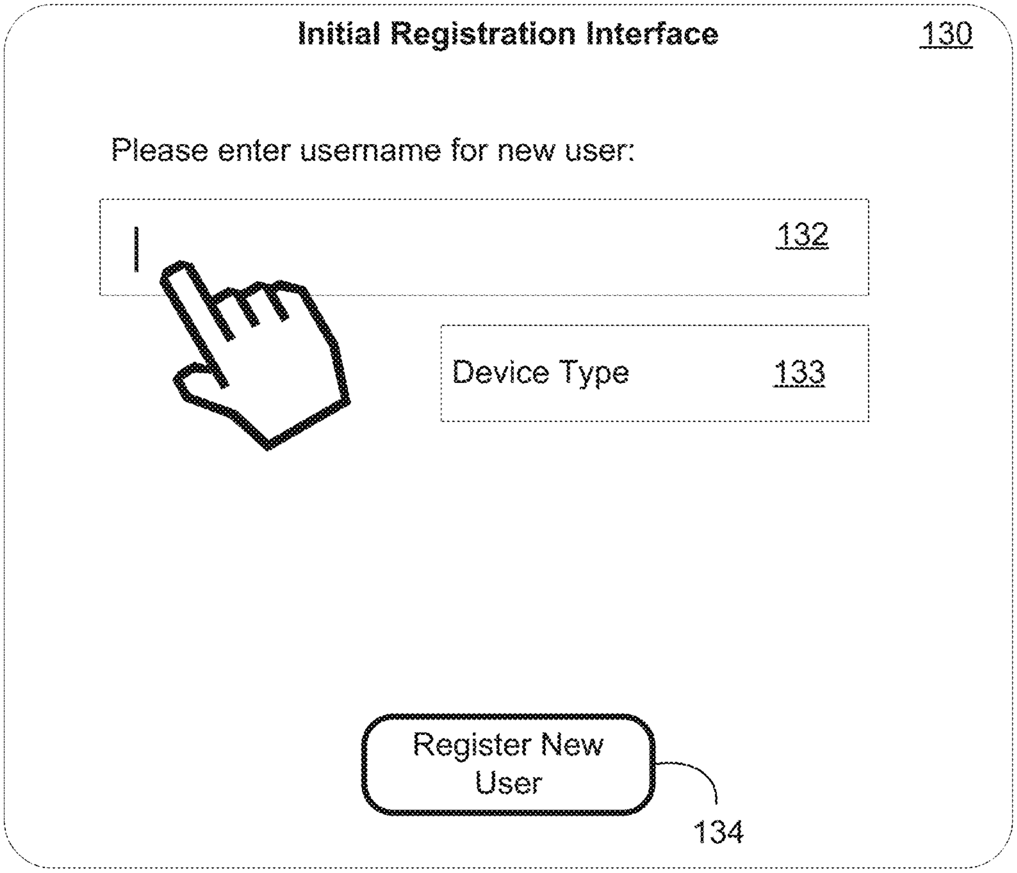
Figure 1C:
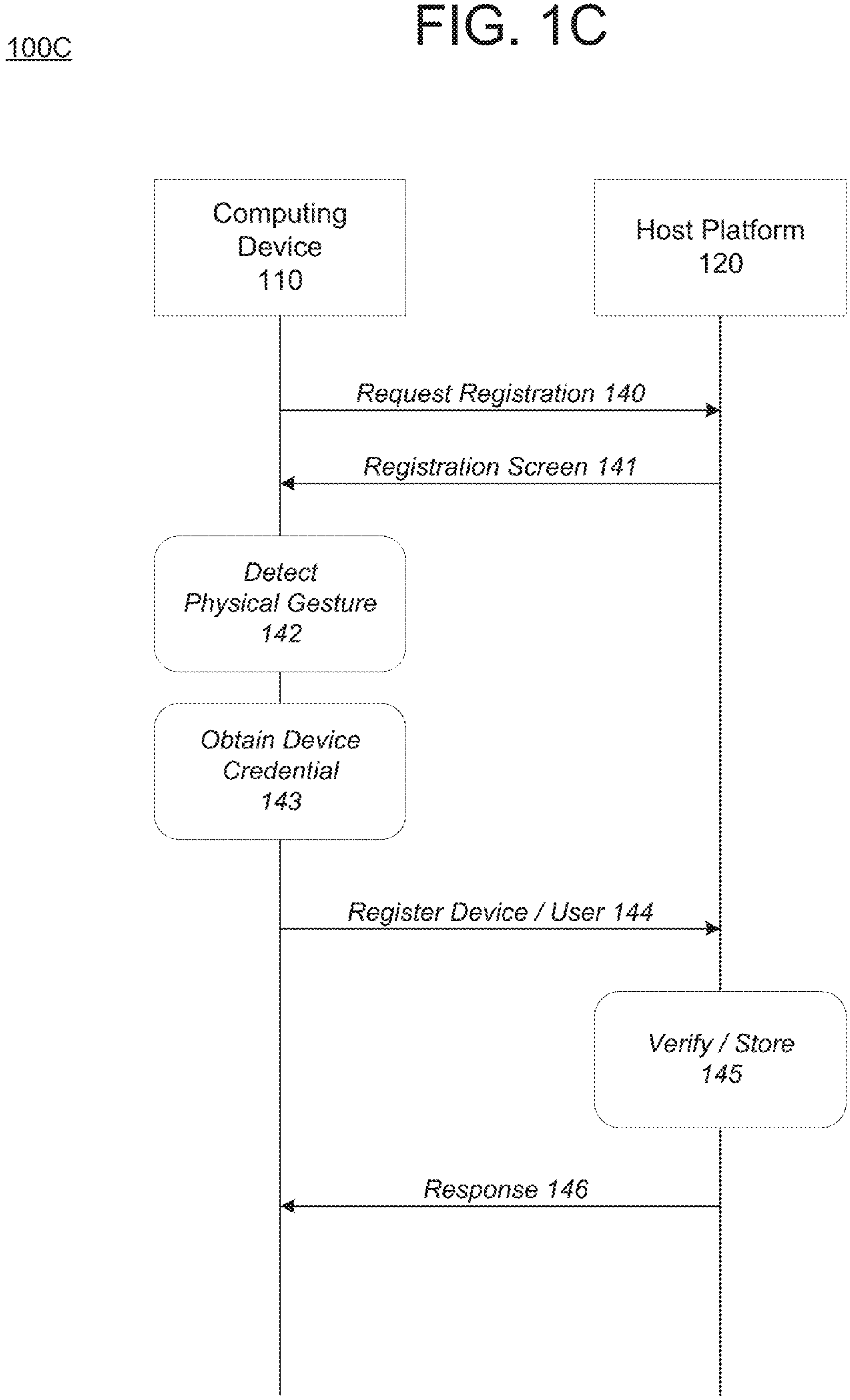

FIGS. 1A-1C illustrate a process of initially registering a passwordless user in accordance with an example embodiment. Referring to FIG. 1A, shown is a computing environment 100A in which an unregistered user initially tries to register with a host platform 120 via a computing device 110 with authentication capabilities. Here, the computing device 110 may be referred to as an authentication device which can store, communicate, and optionally generate device credentials. The computing device 110 may also include a user agent which is software that facilitates communication between the computing device 110 and the host platform 120 such as a web browser, mobile application, software program, etc. Meanwhile, the host platform 120 may be referred to as a relying party/entity which the user is trying to register a passwordless account, and which interacts with the authentication device (computing device 110).

For example, the computing device 110 may include a laptop, a tablet, a mobile phone, a desktop, a smart-wearable device, and the like. The computing device 110 may include the ability to authenticate the user such as through a biometric credential of the user, for example, a fingerprint, a retinal scan, a facial scan, an ear shape, and the like. It should be appreciated that the biometric credential is not limited to any particular credential. In the example embodiments, the computing device 110 may store a biometric profile of its owner/user that occurs during initial registration of the device (e.g., opening the box, etc.) Thus, the computing device 110 may store a biometric profile and use it for comparison when the user subsequently tries to log into the computing device The host platform 120 may host a software application which the user desires to sign-up/register for such as an enterprise resource planning (ERP) application, an email service, a banking application, a social networking service, a work-related software application, or the like. In this example, the host platform 120 may be a web server, a cloud platform, a database, a service, a website, and the like. The host platform 120 may provide a URL which the user can access through a web browser on the computing device 110.

When the user opens the web browser on the computing device 110, and a screen of the computing device 110 is directed to a page hosted by the host platform 120 for the first time, the user may be asked to register for a new account. For example, the host platform 120 may output a user interface 130 as shown in the example of FIG. 1B. Here, the user interface 130 includes a username field 132 for entering a username of the new unregistered user. The user interface 130 also includes a device type field 133 that allows the user to specify the type of device being added to the passwordless user account (e.g., laptop, mobile phone, hardware security key, desktop, etc.) The user interface 130 also includes a registration button 134 which when selected, attempts to register the unregistered user with the host platform 120. However, in this example, the user interface 130 does not include a password field.

The user may enter a username (e.g., an email address, etc.) into the username field 132 and press submit on the registration button 134. The host platform 120 may check to see if the username is available or perform other means of verifying the username such as sending a verification email to the email address, etc., and if so accepts the username as a new user. When the user presses the register button 134, the user may be prompted to enter a physical gesture into the computing device 110 (shown in FIG. 1A) to verify their physical presence at the authentication device. The physical input can be anything from a switch input, a slider input, a biometric input, a button press, etc. The purpose of the physical input is to verify the user is present at the authentication device, and also verify the user's intent to access their account with the authentication device.

In response to the physical input, the user may successfully register the computing device 110 with the host platform 120 as a trusted authentication device for the passwordless user account. Here, the computing device 110 may become the first trusted device for accessing the user's passwordless account. In other words, the user may register the computing device 110 as a means for accessing their passwordless user account hosted by the host platform 120. Thus, the unregistered user can become a passwordless user with respect to the application hosted by the host platform 120. The host platform 120 may allow the user to access any sensitive data, etc., to the passwordless user account via the computing device 110.

FIG. 1C illustrates an initial registration process 100C being performed between the computing device 110 and the host platform 120. Here, the computing device 110 and the host platform 120 may connect to each other via a network such as the Internet. In other words, the computing device 110 and the host platform 120 may be logically separate devices. Referring to FIG. 1C, in 140, the computing device 110 sends a registration request to the host platform 120. For example, the registration request may be sent in response to the user opening the URL/landing page of the application hosted by the host platform 120. In response, in 141, the host platform 120 outputs the user interface 130 shown in FIG. 1B on the screen of the authentication device.

In 142, the computing device 110 may capture the physical input of the user entered via the authentication device 110. In 143, the computing device 110 may obtain a device credential that is capable of verifying the computing device 110. For example, the device credential may use some combination of randomness, hardware, and software to generate a credential. For example, the credential may include a symmetric secret (randomly generated bytes), an asymmetric public/private key pair, or the like. In the example of the public/private key pair, the computing device 110 may sign a message with its private key. The computing device 110 may send its public key to the host platform 120 to verify the signature. This step may include a series of communications, but only one is shown for brevity.

In 144, the computing device 110 transmits a request to register the user and the device to the host platform 120. For example, the request may include the device credential obtained by the computing device 110, which might contain or otherwise encapsulate an indication that the user is present at the computing device 110. The identifier may be a flag that is checked by the computing device 110 that tells that a user is present (i.e., the physical input has been detected by the computing device 110).

Here, the host platform 120 may verify the device credential from the computing device 110 and the identifier exists, and register the unregistered user as a passwordless user that includes a trusted device (i.e., the computing device 110). In this case, the host platform 120 may create a new account on behalf of the user, which does not require a password. Instead, the newly created account can include the username as a user identifier, and an identifier of the computing device 110 such as the device credential. For example, the device credential and a device identifier (e.g., IP address, geographical coordinates, media access control (MAC) address, etc.) of the computing device 110 may be stored within the account data at the host platform 120 and used to identify the passwordless user. Thus, no passwords are needed for initially registering an unregistered user with the host platform 120, only a physical presence at the authentication device and confirmation from the already registered/trusted computing device 110. In 146, the host platform 120 may transmit a response indicating successful registration.

When the user desires to subsequently access their passwordless account via the trusted computing device, the user may open up the login screen. Here, the login screen may ask the user whether they would like to access their passwordless account. In this case, the user may be required to verify that they are physically present at the trusted computing device by pressing a button, inputting a biometric, moving a switch/slider, etc. In doing so, the user proves they are present and intend to use the authentication device to log into their passwordless account. The trusted device creates the previously used device credential and sends the device credential to the host platform along with confirmation that a physical gesture has been received at the trusted computing device. Upon receiving the device credential and the verification of the user's presence from the authentication device, the host platform can allow the user access to the user's passwordless account via the authentication device where the logging in is being performed.

In some embodiments, the trusted computing device is responsible for authenticating the user prior to the user accessing their passwordless account on the host platform. Thus, the host platform may enable the authenticating device/user device a user instead of performing the verification of the user itself through the user of passwords or biometric profiles stored at the host platform. Furthermore, the host platform also verifies the authenticating device based on the credential exchange between the authenticating device and the host platform which allows the host to challenge/trust the authenticating device.

Figure 2A:
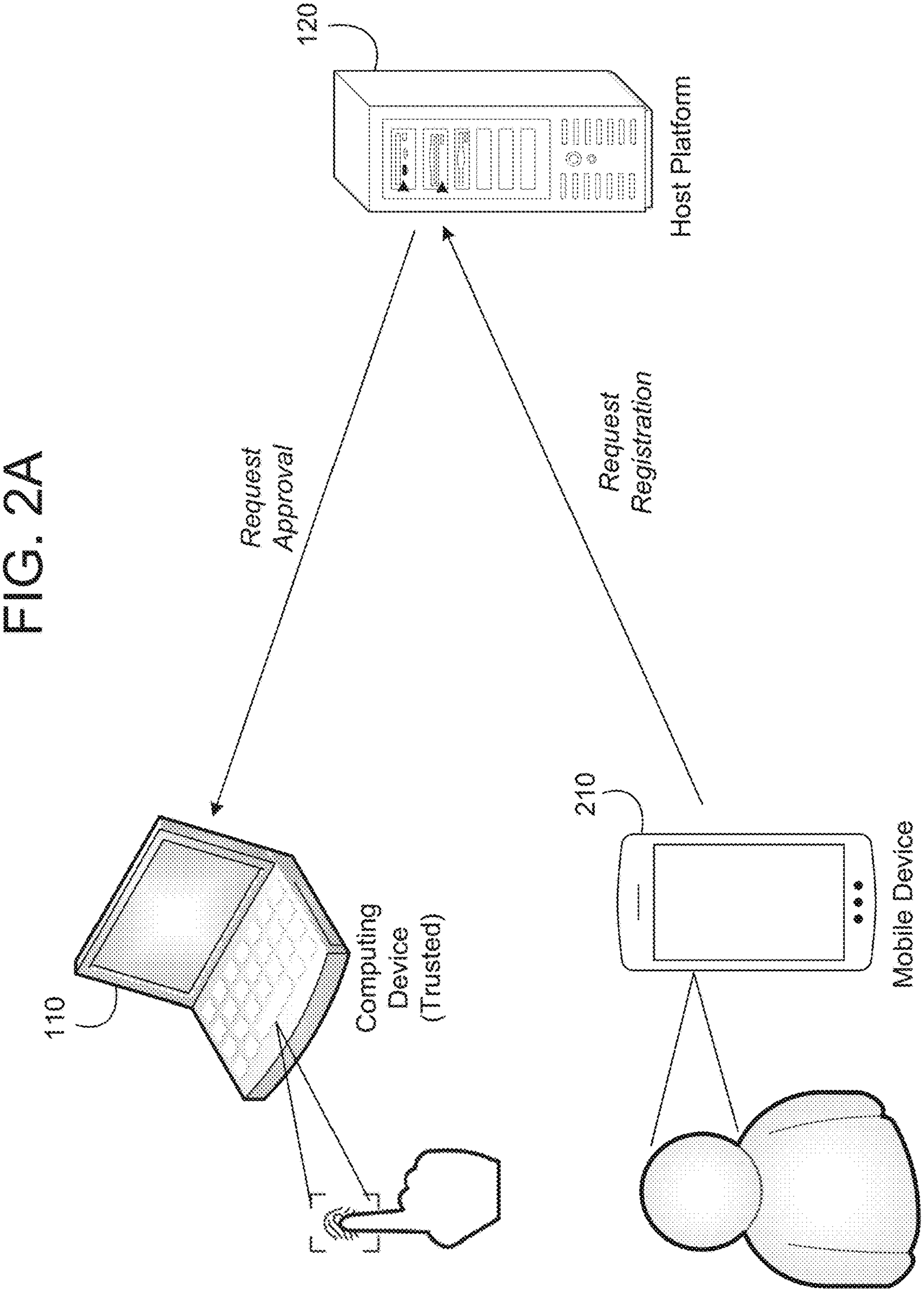
FIGS. 2A-2B are diagrams illustrating a process registering an untrusted device in accordance with example embodiments.
Figure 2B:
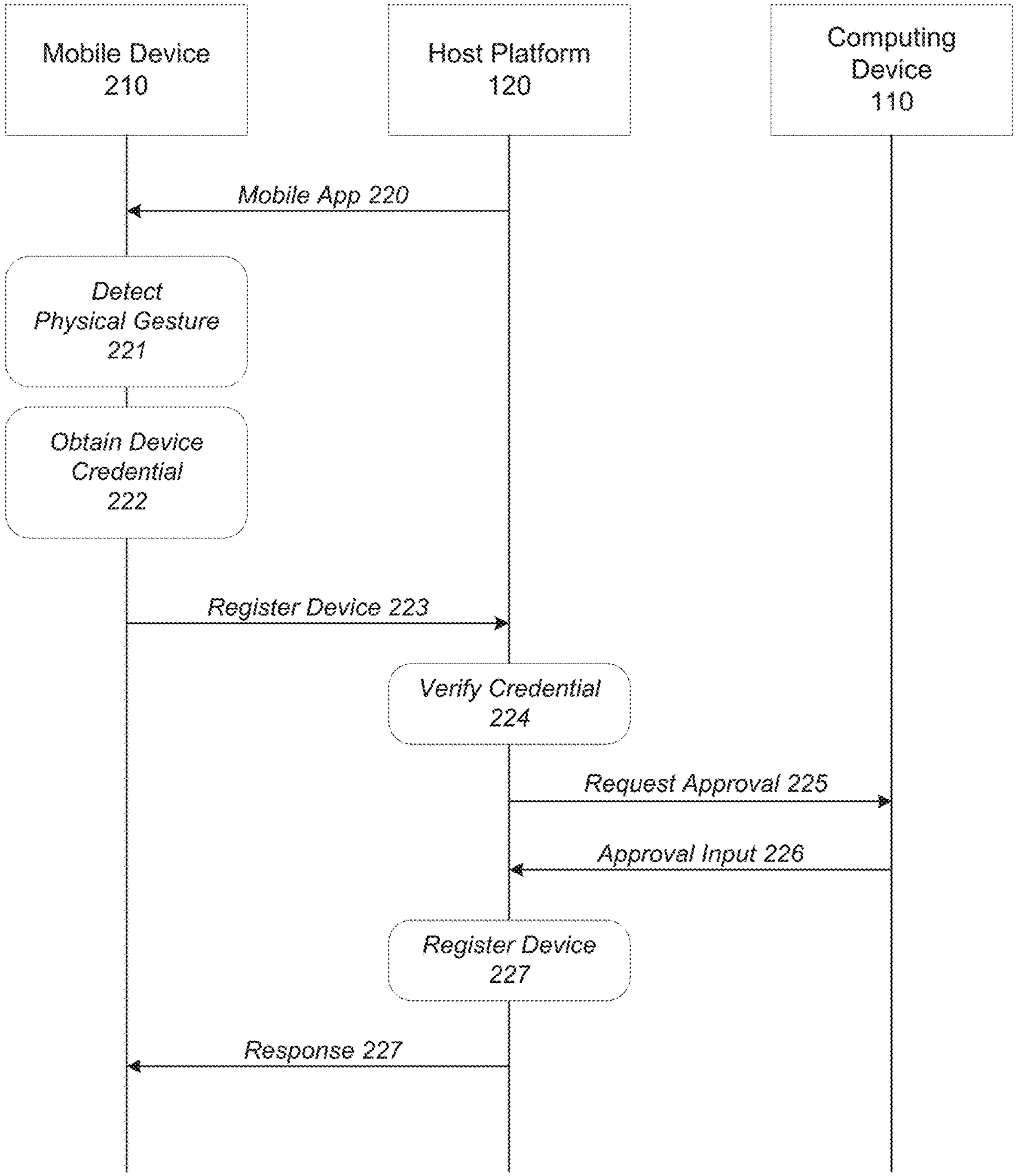

FIGS. 2A-2B illustrates a process registering an untrusted device in accordance with example embodiments. Referring to FIG. 2A, shown is a computing environment 200A in which a user adds a second device 210 to their network of trusted devices of a previously created passwordless user account. Referring to FIG. 2A, the user may download and install a mobile application on the mobile device 210 which is hosted by the host platform 120. In this example, it is assumed that the mobile device 210 can authenticate a user via a facial scanning program on the mobile device 210.

The host platform 120 may output a page or window on the mobile device 210 including a similar user interface as the user interface 130 shown in FIG. 1B. The user may be asked to enter their username, select a device type of mobile device, and press a register button. In response to submitting the previously registered username, the host platform 120 may request the mobile device 210 to receive a physical input/gesture of some kind from the user to prove intent to use the mobile device 210 to access the account. As a non-limiting example, the mobile device 210 may capture a face scan, etc. and send notice of the physical input to the host platform 120.

Next, the host platform 120 may output a pop-up window, push notification, etc., on the computing device 110 asking if the user is trying to register the mobile device 210. Furthermore, the prompt may include additional details such as a make/model of the device, the IP address of the device, a geolocation of the device, and the like. Here, the computing device 110 is now a trusted device as a result of the registration process shown in FIG. 1C. The user may be required to perform another physical gesture via the computing device 110 (e.g., fingerprint scan, etc.) to verify they are physically present with the trusted computing device 110. In response to successfully authenticating the user via the computing device 110, the host platform 120 may add the mobile device 210 as a second trusted device of the passwordless user account.

Referring to FIG. 2B, a process 200B of registering an untrusted device (mobile device 210) to a user's passwordless account is shown. Referring to FIG. 2B, in 220, the user downloads a mobile application hosted by host platform 120 to the mobile device 210. The user may install the mobile application and open the application on a screen of the mobile device 210. The user may initiate registration by accessing the application for the first time, selecting a button on the screen, etc. In 221, the mobile device 210 may capture a physical gesture (e.g., a face scan, etc.) of the user which is input via the mobile device 210. Here, the physical gesture proves that the user is physically present at the mobile device 210. In 222, the mobile device 210 obtains a credential which can be used to verify the mobile device 210. For example, the credential may be generated by the mobile device or obtained from a trusted source. The credential may include a symmetric secret, an asymmetric public key/private key signature verification, or the like. In some cases, the step 222 may include multiple communications between the mobile device 210 and the host platform 120 to verify the mobile device 210.

In 223, the mobile device 210 transmits a registration request to the host platform 120 which may include the obtained credential, an identifier of the mobile device 210 (e.g., IP address, geolocation data, a MAC address, etc.), and the like. The registration request may also indicate (e.g., with an identifier, flag, etc.) that a user is physically present based on the physical gesture being input. In 224, the host platform 120 may verify the device credential. Prior to finalizing the registration, the host platform 120 transmits an approval request to the previously registered computing device 110 in 225. For example, the host platform 120 outputs a pop-up window on a screen of the computing device 110 requesting confirmation that the user is attempting to add a second device (mobile device 210) to the passwordless user account. In 226, the host platform 120 may receive a physical response from the user via the computing device 110 providing that the user is also physically present with the computing device 110. In addition, the computing device 110 uses its previously registered device credential to prove it is the computing device 110. If the response is a confirmation, the host platform 120 may register the mobile device 210 as a second trusted device in 227, and transmit a response in 228 indicating successful registration. For example, the host platform 120 may store the identifier of the mobile device 210 within the passwordless user account thereby registering the mobile device 210 as a trusted device of the passwordless user.

Anyone who knows the user's email/username could attempt to register a device to the previously registered passwordless user account. However, the host platform 120 uses a previously registered trusted device (computing device 110) to verify that the actual user of the passwordless account is trying to register the mobile device 210. If the user is not trying to register the mobile device 210, they may submit a "deny" response on the computing device 110 in response to the pop-up notification from the host platform 120. Meanwhile, if the user is the actual user trying to add the mobile device 210, the host platform 120 can authenticate the user without a password via the computing device 110 that is now a trusted device. More specifically, the previously trusted computing device 110 uses its device credential to authenticate itself so the host platform can trust the response.

As will be appreciated, the user is not using physical gestures such as biometrics, facial scans, button presses, etc., to directly authenticate themselves during a login to a passwordless user account. Rather, the user is using trusted devices to login to the passwordless user account, and using the physical gesture to prove that the user is in the physical presence of the trusted devices. Therefore, there is no database of biometric credentials or passwords, but rather a database of trusted device identifiers and credentials. Thus, a hacker cannot simply steal a biometric credential (or password) and break into the passwordless user account. Rather, they must have both physical access to the trusted device and the ability to access the user's authentication device such as through the user's biometric credential.

Figure 3A:
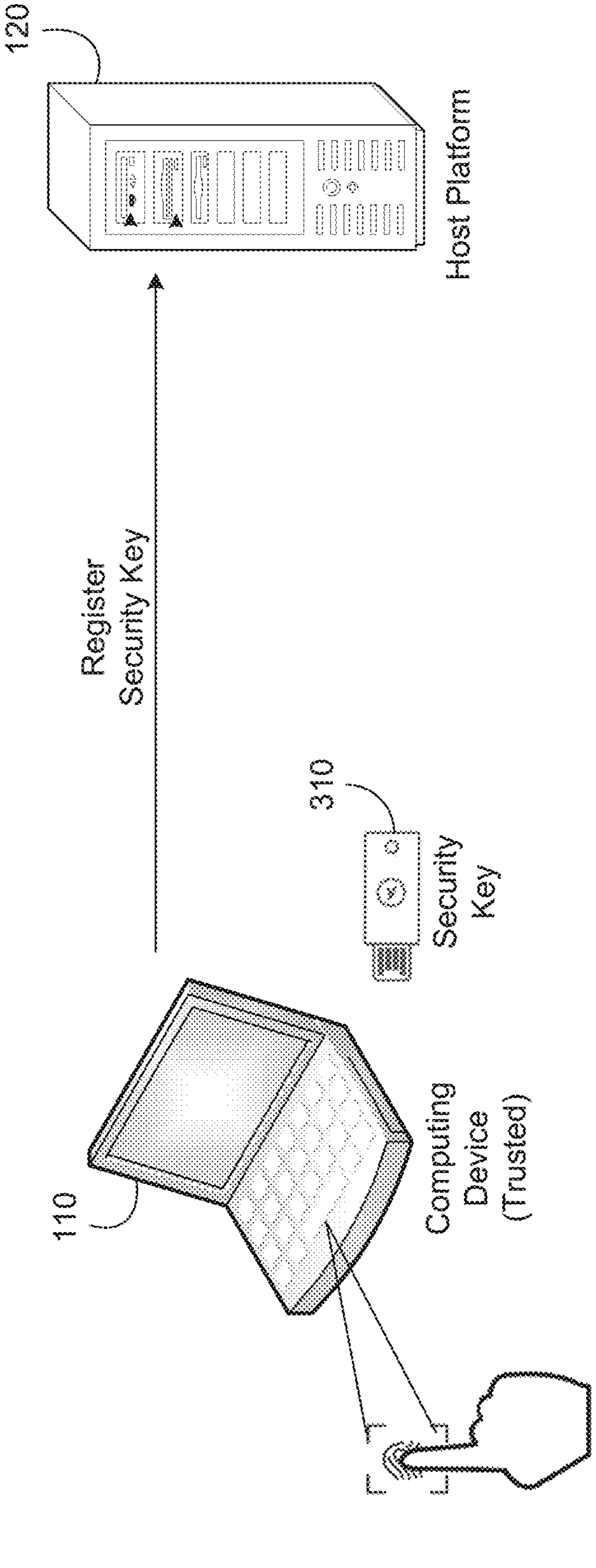
FIGS. 3A-3B are diagrams illustrating a process of registering a security key in accordance with an example embodiment.
Figure 3B:
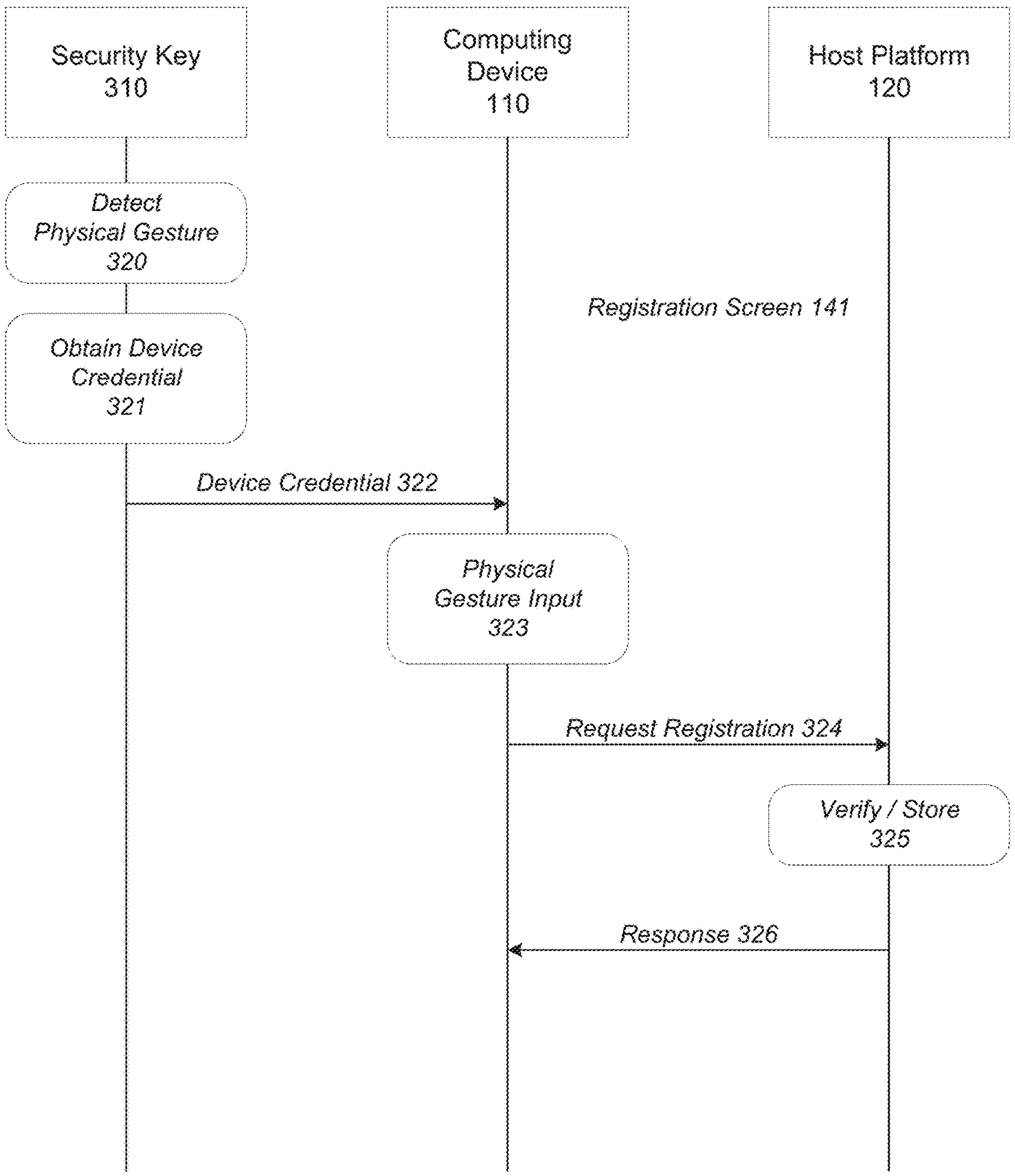

FIGS. 3A-3B illustrate a process of registering an external device such as a security key in accordance with an example embodiment. Referring to FIG. 3A, a computing environment 300A is shown in which a user may register a hardware security key 310 to a network of trusted devices of a passwordless user account. For example, the user may connect or otherwise plug-in the hardware security key 310 into the computing device 110. In this example, the computing device 110 is a previously registered/trusted device of the passwordless user. The hardware security key 310 may be any type of hardware security key and may connect to the computing device via a universal serial bus (USB) interface, etc. Here, the hardware security key 310 may be an external device that connects to the computing device 110 such as through an input port, a WiFi network, a Bluetooth channel, or the like.

The user may initially receive a user interface requesting the user to register a new device. In this example, the user may select a security key option as a device type to register, and click a register button. In response, the host platform 120 may output a request on the computing device 110 asking the user to perform an input/press a button, etc., on the hardware security key 310 to verify that the user is in the presences of the hardware security key 310 and the computing device 110. In response to the user pressing the input on the hardware security key 310, the hardware security key 310 will detect the user gesture and include that in the request. The hardware security key 310 may generate its own credential and communicate the device credential to the host platform by passing messages to the computing device 110/software running on the computing device.

If the user were to lose the computing device 110 and/or the mobile device 210, the user could use the registered hardware security key 310 to reclaim their account via an untrusted device (e.g., public computer). For example, the user may insert their registered hardware security key 310 into an untrusted device and gain access to the passwordless account based on the hardware security key 310 by pressing a button the hardware security key 310 to verify they are physically present, and exchange the registered device credential to the host platform to prove itself.

FIG. 3B illustrates a process 300B of a user registering the hardware security key 310 with the host platform 120. Referring to FIG. 3B, in 320, the hardware security key 310 detects physical gesture such as a press of a button on the hardware security key 310 and obtains a device credential in 321. The device credential may be similar to the previously obtained device credentials and may include a random secret, a public/private key signature, etc. In 322, the computing device 110 obtains the device credential from the hardware security key 310. Furthermore, in 323, the computing device 110 obtains a physical gesture of the user via an input device of the computing device 110. For example, the user may generate a biometric, a retinal scan, press another button, etc. to verify that the user is physically present at the computing device 110.

In 324, the computing device 110 transmits a registration request to the host platform 120. The registration request includes the device credential and a device identifier of the hardware security key 310. In 325, the host platform 120 verifies that the user has been authenticated via the trusted computing device 110, verifies the device credential from the hardware security key, and stores an identifier of the hardware security key in the user's passwordless account in response to successful verifications. In 326, the host platform 120 transmits a response to the computing device 110 notifying of successful registration.

Figure 4:
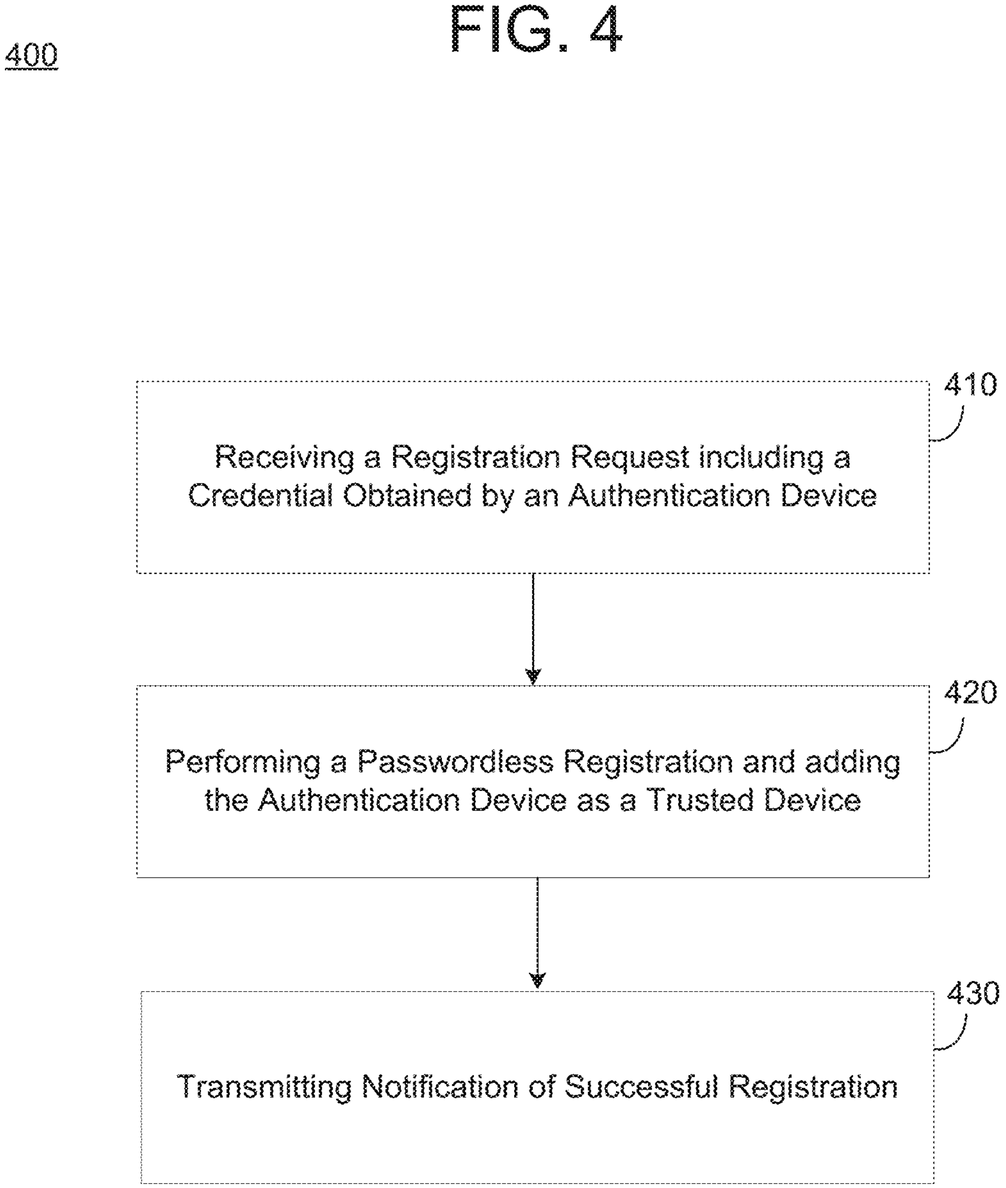
FIG. 4 is a diagram illustrating a method of performing a passwordless registration process in accordance with an example embodiment.

FIG. 4 illustrates a method 400 of performing a passwordless registration process in accordance with an example embodiment. As an example, the method 400 of FIG. 4 may be performed by a web server, a cloud platform, a database, a service, a website, and the like. Referring to FIG. 4, in 410, the method may include receiving a registration request of an unregistered user from an authentication device, the registration request comprising a user identifier and a device credential obtained by the authentication device.

In 420, the method may include performing a passwordless registration of the unregistered user with an application, wherein the performing comprises registering the unregistered user as a passwordless user with passwordless access to the application and registering the authentication device as a first trusted device of the passwordless user. In 430, the method may include transmitting a notification indicating successful passwordless registration to the computing device. The device credential may include a shared random secret value. As another example, the device credential may include a signature created by a public key, where the host platform includes a corresponding private key capable of verifying the signature created by the public key.

In some embodiments, the credential obtained by the computing device may include at least one of a symmetric secret and an asymmetric key. In some embodiments, the method may include performing the passwordless registration of the unregistered user in response to detecting a physical gesture has been input to the authentication device. In some embodiments, the method may further include receiving a subsequent request for passwordless access to the application from the authentication device, the subsequent request comprising the device credential and verification of a physical gesture on the authentication device. In this example, the method may further include providing subsequent access to the application via the authentication device in response to verifying the device credential in the subsequent request.

In some embodiments, the method may further include receiving, from an untrusted device, a request to register the untrusted device with the passwordless user, the request comprising a verification of a physical gesture performed at the untrusted device, transmitting a verification request to the previously registered authentication device, and in response to receiving a physical gesture confirmation response via the authentication device, registering the untrusted device as a second trusted device of the passwordless user. In some embodiments, the method may further include receiving, via the authentication device, a request to register a hardware security key with the passwordless user, the request comprising a credential obtained by the hardware security key and verification of a physical gesture performed on the hardware security key while attached to the authentication device, and in response, registering the hardware security key as a third trusted device of the passwordless user.

In these examples, the unregistered user does not enter a password during the passwordless registration. In some embodiments, the method may further include displaying a registration interface comprising a field for a username and a registration button, on the computing device, wherein the registration interface does not comprise a field for a password.

Figure 5:
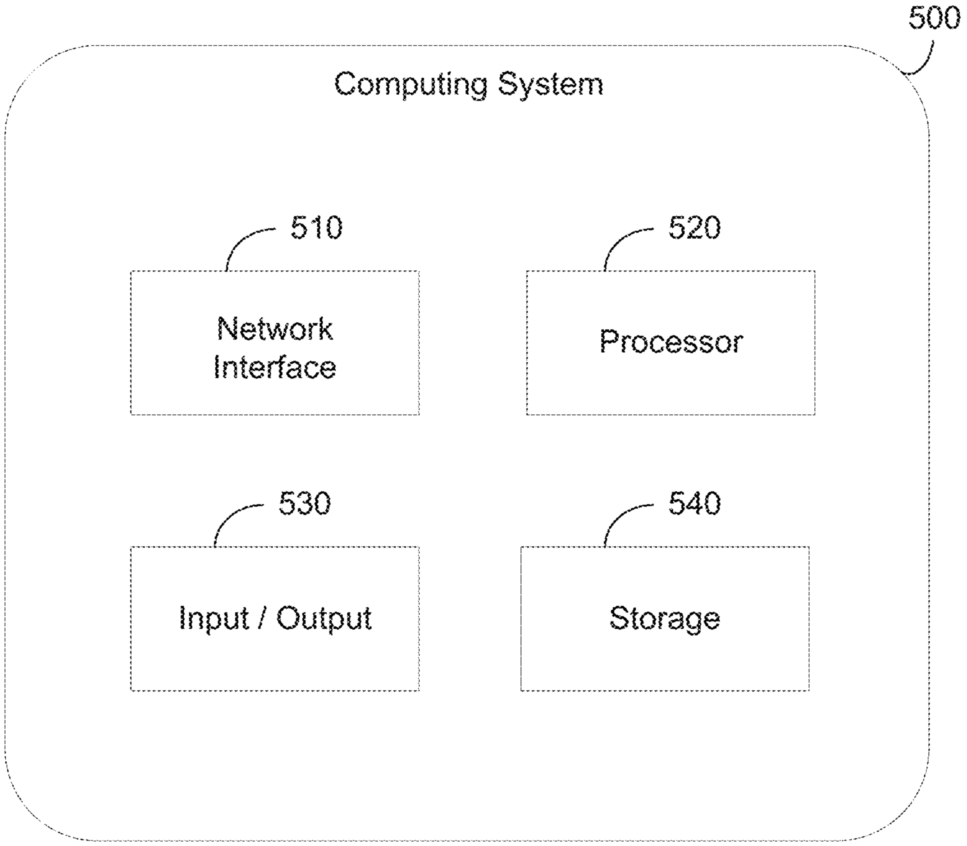
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be the host platform 120, the computing device 110, the mobile device 210, and the like. In some embodiments, the computing system 500 may be distributed across multiple computing devices such as multiple database nodes. In FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, partitions and sub-partitions. Here, the data store may store parity data in columnar fashion. Therefore, the storage 540 may be used to store database objects, records, items, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, “apps”, or code) may include machine instructions for a programmable processor, and may be implemented in a high-level procedural and/or object-oriented programming language, and/or in assembly/machine language. As used herein, the terms “machine-readable medium” and “computer-readable medium” refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The “machine-readable medium” and “computer-readable medium,” however, do not include transitory signals. The term “machine-readable signal” refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims

What is claimed is:

1. A computing system comprising:

a network interface configured to receive a registration request of an unregistered user from an authentication device, the registration request comprising a user identifier and a device credential obtained by the authentication device; and a processor configured to initially register the authentication device as a first trusted device of the user and set access credentials of the user to the device credential, wherein the network interface is further configured to receive a second registration request of the user from an additional user device, the second registration request including a second device credential created by the additional user device, and wherein the processor is further configured to display information about the additional device on a screen of the authentication device with a prompt that requests permission to add the additional user device as a trusted device, detect an approval submission via the authentication device, and in response, register the additional device as a second trusted device of the user and modify the access credentials of the user to include the second device credential.

2. The computing system of claim 1, wherein the processor is further configured to perform the initial registration of the unregistered user in response to detecting a physical gesture has been input to the authentication device.

3. The computing system of claim 1, wherein the device credential created by the authentication device is specific to one client on the authentication device and comprises at least one of a symmetric secret and an asymmetric key generated by the authentication device.

4. The computing system of claim 1, wherein the processor provides subsequent access to the application via the additional device in response to the detecting of the approval submission via the authentication device.

5. The computing system of claim 1, wherein the processor is further configured to:

transmit a verification request to the authentication device with the prompt that requests permission to add the additional user device; and register the additional device as the second trusted device of the user in response to receiving a physical gesture confirmation response via the authentication device.

6. The computing system of claim 1, wherein the processor is further configured to:

receive, via the authentication device, a request to register an external device with the user, the external device being decoupled from and connected to the authentication device, and the request comprising a third device credential obtained by the external device and verification of a physical gesture performed on the external device; and in response, register the external device as a third trusted device of the user and modify the access credentials of the user to include the third device credential.

7. The computing system of claim 1, wherein the unregistered user does not enter a password during the initial registration and the second registration.

8. The computing system of claim 1, wherein the processor is further configured to display an initial registration interface comprising a field for a username and a registration button, on the computing device, wherein the initial registration interface does not comprise a field for a password.

9. A method comprising:

receiving a registration request of an unregistered user from an authentication device, the registration request comprising a user identifier and a device credential obtained by the authentication device;

initially registering the authentication device as a first trusted device of the user and setting access credentials of the user to the device credential;

receiving a second registration request of the user from an additional user device, the second registration request including a second device created by the additional user device; and displaying information about the additional device on a screen of the authentication device with a prompt that requests permission to add the additional user device as a trusted device, detecting an approval submission via the authentication device, and in response, registering the additional device as a second trusted device of the user and modifying the access credentials of the user to include the second device credential.

10. The method of claim 9, wherein the initially registering of the user is performed in response to detecting a physical gesture has been input to the authentication device.

11. The method of claim 9, wherein the device credential created by the authentication device is specific to one client on the authentication device and comprises at least one of a symmetric secret and an asymmetric key generated by the authentication device.

12. The method of claim 9, wherein the method further comprises providing subsequent access to the application via the additional device in response to the detecting of the approval submission via the authentication device.

13. The method of claim 9, wherein the method further comprises:

transmitting a verification request to the authentication device with the prompt that requests permission to add the additional user device; and registering the additional device as the second trusted device of the user in response to receiving a physical gesture confirmation response via the authentication device.

14. The method of claim 9, wherein the method further comprises:

receiving, via the authentication device, a request to register an external device with the user, the external device being decoupled from and connected to the authentication device, and the request comprising a third device credential obtained by the hardware security key and verification of a physical gesture performed on the external device; and in response, registering the external device as a third trusted device of the user and modifying the access credentials of the user to include the third device credential.

15. The method of claim 9, wherein the unregistered user does not enter a password during the initial registration and the second registration.

16. The method of claim 9, wherein the method further comprises displaying an initial registration interface comprising a field for a username and a registration button, on the computing device, wherein the initial registration interface does not comprise a field for a password.

17. A non-transitory computer-readable medium comprising instructions which when executed by a processor cause a computer to perform a method comprising:

receiving a registration request of an unregistered user from an authentication device, the registration request comprising a user identifier and a device credential obtained by the authentication device;

initially registering the authentication device as a first trusted device of the passwordless user and setting access credentials of the user to the device credential;

receiving a second registration request of the user from an additional user device, the second registration request including a second device credential created by the additional user device; and displaying information about the additional device on a screen of the authentication device with a prompt that requests permission to add the additional user device to the software application, detecting an approval submission via the authentication device, and in response, registering the additional device as a second trusted device of the user and modifying the access credentials of the user to include the second device credential.

18. The non-transitory computer-readable medium of claim 17, wherein the initially registering of the user is performed in response to detecting a physical gesture has been input to the authentication device.

19. The computing system of claim 1, wherein the processor is further configured to set the second trusted device as capable of authenticating additional untrusted devices via the second trusted device.

* * * * *